Jan. 6, 1953     H. M. STEPHENSON     2,624,435
HYSTERETIC OVERRUNNING CLUTCH
Filed Jan. 10, 1950
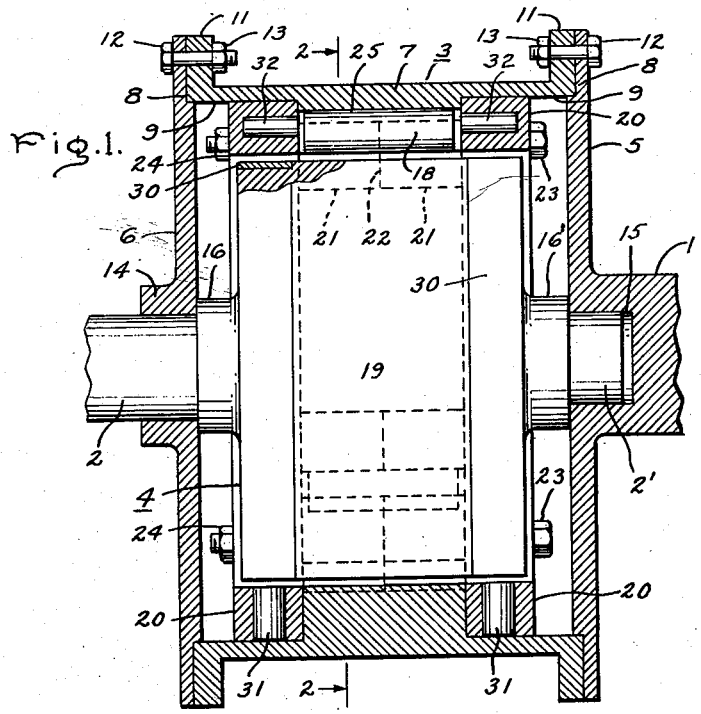
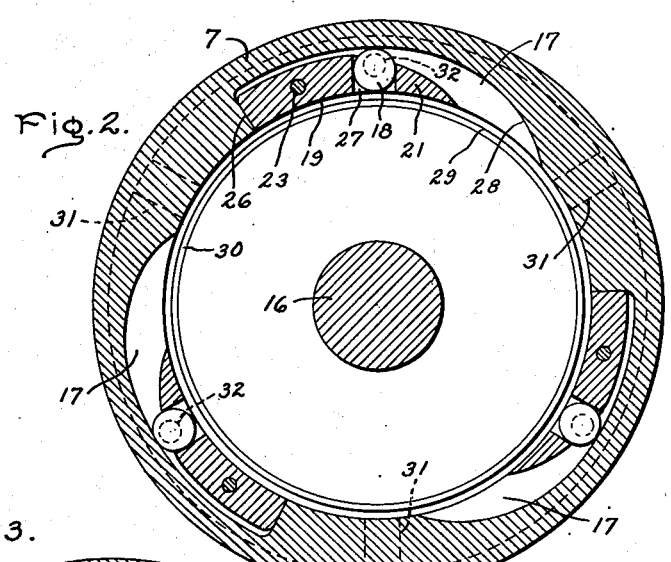
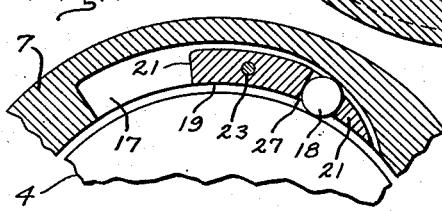
Inventor:
Hugh M. Stephenson,
by Ernest C. Britton
His Attorney.

Patented Jan. 6, 1953

2,624,435

UNITED STATES PATENT OFFICE 2,624,435

HYSTERETIC OVERRUNNING CLUTCH

Hugh M. Stephenson, Fort Wayne, Ind., assignor to General Electric Company, a corporation of New York Application January 10, 1950, Serial No. 137,778

1 Claim. (Cl. 192—45)

My invention relates to clutching devices of the unidirectional type through which rotary power may be transmitted in one direction but which prevent transmission in the opposite direction due to over-running or free-wheeling action therein. More particularly, the invention relates to devices of this type wherein clutching and free-wheeling are effected in response to hysteretic interaction between certain elements thereof.

In many power transmission applications there is a need for a positive unidirectional or free-wheeling clutching device to permit power transmission in one direction and to prevent such transmission in the event of overdriving or tendency for the direction of power transmission to be reversed. An example of such an application is the starting of a gas turbine by the use of an electric motor which may be coupled to the rotor of the turbine through a variable speed transmission device. The motor is arranged to supply the driving torque required to bring the rotor from standstill to the speed at which firing of the turbine occurs and an internal driving torque is developed which is sufficient to sustain rotation thereof.

After self-sustained rotation occurs, the turbine rotor tends to overdrive the starting motor through the transmission device. Under such conditions the motor may be driven at a destructive speed if not released, since gas turbine rotors generally rotate at relatively high speeds. It is essential, therefore, that a free-wheeling device be provided to effect disengagement of the starting motor from the gas turbine rotor when the latter tends to overdrive the former and permit the starting motor to remain idle while the rotor is rotating at relatively high speeds.

It is a principal object of this invention to provide certain improvements in free-wheeling devices which may themselves be employed as power transmitting devices, or which may be employed in connection with other power transmission mechanisms to effect free-wheeling action therein.

One type of free-wheeling device which is well-known makes use of rollers which are free to roll in wedge-shaped slots between relatively rotatable clutch members. With one direction of relative rotation the rollers tend to be positioned at enlarged portions of the slots and offer no appreciable resistance to free relative rotation of the members. However, upon reversal of the direction of rotation, the rollers tend to be wedged in reduced portions of the slots thus tending to lock the members together, thereby preventing relative rotation therebetween. Heretofore devices of this type have relied principally upon mechanical contact, however slight, in the over-running condition to effect engagement of the clutch. In accordance with an embodiment of the invention which is illustrated herein, there are provided in a free-wheeling mechanism of the above-mentioned type certain improvements whereby engagement and disengagement of relatively rotating clutch elements are effected in response to hysteretic interaction between relatively rotating magnetic actuating elements, so that no running contact of the clutch elements exists in the over-running condition.

For a better understanding of the invention, attention is now directed to the following description taken in connection with the accompanying drawing, and to the appended claim, in which the features of the invention believed to be novel are more particularly set forth. In the drawing Fig. 1 is a longitudinal section of a free-wheeling device embodying certain features of the invention; Fig. 2 is a cross-section taken along the line 2—2 in Fig. 1 showing the positions of the principal elements of the device in the free-wheeling condition; and Fig. 3 is a portion of the view of Fig. 2 showing the elements in the engaged condition.

Referring now to Fig. 1 there is shown a free-wheeling clutch mechanism having a pair of coaxial shafts 1 and 2. Either shaft may be considered an input shaft while the other is considered an output shaft as will be more fully described hereinafter. Shafts 1 and 2 are secured to and are rotatable with inner and outer clutch members 3 and 4, respectively. Member 3 is in the form of a hollow outer casing comprising a pair of end flange members 5 and 6 and a generally cylindrical center member 7. Flange 5 may conveniently be integral with shaft 1. Flanges 5 and 6 are concentrically positioned relative to cylindrical member 7 by a pair of rabbets 8 which engage inner surfaces 9 at the extremities of member 7. Flanges 5 and 6 are secured to member 7, which is provided with a pair of end flanges 11, by the use of a plurality of bolts 12 and nuts 13. Thus, shaft 1, flanges 5 and 6 and cylindrical member 7 form a unitary assembly.

Inner clutch member 4 is a generally cylindrical member having a portion 2' of shaft 2 extending therethrough. Shaft 2 is journaled in a bearing portion 14 of flange 6, and shaft extension 2' is similarly journaled in a recessed portion 15 of shaft 1 and flange 5. Member 4 is axially positioned relative to flanges 5 and 6 by hub portions 16 and 16' of shafts 2 and 2', respectively.

It will be seen that the arrangement thus far described comprises principally the unitary assembly of shaft 1 and outer clutch member 3 and the unitary assembly of shaft 2 and inner clutch member 4. These assemblies are relatively rotatable and are mutually journaled axially and longitudinally by self-contained bearing surfaces. It will be understood that in use of the free wheeling device with associated apparatus shafts 1 and 2 are generally coupled to the shafts of such apparatus and are supported by external bearings which are not shown in the drawing.

Attention is next directed to Fig. 2 which is a cross section taken along the line 2—2 of Fig. 1. Cylindrical member 7 is provided with a plurality of equally-spaced wedge-shaped slots 17 extending axially along the inner surface thereof. A plurality of locking rollers 18 formed of a magnetic material, such as steel, are positioned in slots 17 and are equally spaced relative thereto by a cage assembly 19, which is best seen by reference to both Fig. 1 and Fig. 2. Cage assembly 19 which is formed of a non-magnetic material, comprises a pair of ring-shaped end portions 20 spaced apart by a plurality of interconnecting portions 21 which are preferably integral therewith. Thus cage assembly 19 is actually made up of two substantially identical sections joined in mating engagement at surfaces 22 and secured together by a plurality of bolts 23 and nuts 24.

Ring portions 20 are journaled on surfaces 9 making cage 19 rotatable with respect to cylindrical member 7 of outer clutch member 3. Cage 19 is restrained from axial motion relative to member 7 by reduced portions 25 thereof between slots 17. The degree of rotation of cage 19 is limited in the counter-clockwise direction by interference between interconnecting portions 21 and the ends of slots 17 as indicated at 26. Interconnecting portions 21, which are generally wedge-shaped to conform to the shape of slots 17 and are positioned therein, are provided with a plurality of slots 27 extending substantially the full distance between ring portions 20 and arranged to receive rollers 18.

The diameter of rollers 18 and the space between inner surface 28 of slot 17 and outer surface 29 of inner clutch member 4 is such that rollers 18 engage surfaces 28 and 29 when positioned at the reduced end of slots 17. When rollers 18 are positioned toward the enlarged end of slots 17, however, the spacing between surfaces 28 and 29 is greater than the diameter of rollers 18 so that rollers 18 may not engage both surfaces 28 and 29 simultaneously. In other words, if rollers 18 occupy their extreme clockwise position, locking engagement is effected between clutch members 3 and 4. If, however, rollers 18 occupy their extreme counterclockwise position, locking engagement between members 3 and 4 is not effected and a free-wheeling condition exists therebetween.

A pair of cooperating magnetic actuating elements are provided to effect motion of rollers 18 and cage 19. One of these elements, referring again to Fig. 1, is a pair of bands 30 of a high coercive force material, preferably of the copper-nickel-cobalt type, positioned about the outer periphery and at the extremities of inner clutch member 4. The other element comprises a plurality of generally cylindrical permanent magnets 31 positioned in ring portions 20. The magnetic axes of magnets 31 are radial with respect to the axis of rotation of clutch members 3 and 4. Bands 30 and magnets 31 are positioned so that they are in substantially the same planes of rotation about the clutch axis, or in other words so they may act cooperatively. Magnets 31 may be pressed in rings 20 or may be secured by any other convenient holding means. Bands 30 may be shrunk on or otherwise secured to clutch member 4.

A second plurality of generally cylindrical permanent magnets 32 are provided in ring portions 20 at the extremities of slots 27. Magnets 32 are positioned so that their magnetic axes are parallel with the axis of rotation of the clutch and are located slightly beyond the centers of slots 27 as measured in a radially outward direction, so that there is a tendency for magnets 32 to hold rollers 18 away from surface 29 of clutch member 4.

It is well known that a change in flux passed through a high coercive force material, for example the mere passing of an alternating current flux through the material or the relative movement of the source of unidirectional flux causes hysteresis in the high coercive force material thereby producing a force proportional to the hysteretic loss. This force or torque is produced by virtue of the fact that the hysteresis causes the flux density in the material to lag behind the magnetic intensity and the space phase angle between the source of magnetomotive force and the resultant flux produces the torque. Thus in operation, relative motion between bands 30 and magnets 31 causes hysteretic drag therebetween with a tendency for the trailing element to follow the leading element. More particularly, if it is assumed that clutch member 4 is driven from a power source through shaft 2 in a counterclockwise direction, as viewed in Fig. 2, then hysteretic drag between bands 30 and magnets 31 causes cage 19 and rollers 18 to be moved to their extreme counterclockwise position.

In this condition rollers 18 may not engage surfaces 28 and 29 simultaneously and a free-wheeling condition exists between clutch members 3 and 4 as previously described. However, without holding magnets 32 there is a tendency for rollers 18 to engage surface 29 of clutch member 4, particularly if clutch member 3 is stationary and there are no centrifugal forces on rollers 18. Engagement of rollers 18 and surface 29 causes frictional losses and other undesirable effects and therefore it is desirable that such engagement be prevented. Since rollers 18 are formed of a magnetic material magnetic forces between magnets 32 and roller 18 tend to lift rollers 18 away from engagement with surface 29 and cause rollers 18 to engage surfaces 28 and thus be out of contact with rotating clutch member 4.

If it is now assumed that clutch member 4 is driven in a clockwise direction and clutch member 3 is initially stationary, the hysteretic drag between bands 30 and magnets 31 tends to rotate cage 19 and rollers 18 in a clockwise direction. Rollers 18 are thus moved to the reduced portion of slots 17 and are caused to engage surfaces 29 and 28 simultaneously. Clutch members 3 and 4 are thus forced in locking engagement with rollers 18 and power may be transmitted from shaft 2 through clutch members 3 and 4 to shaft 1.

While torque is transmitted from shaft 2 to shaft 1 rollers 18 are maintained in their locking positions by the driving forces in the clutch. Under this condition clutch members 3 and 4 rotate at the same speed and magnetic actuating elements 30 and 31 serve no function. Holding magnets 32 likewise serve no function since rollers 18 engage both surfaces 28 and 29. The engaged condition of clutch members 3 and 4 with rollers 18 is shown in Fig. 3.

If it is now assumed that there is a tendency for shaft 1 to overdrive shaft 2 in the same direction, as for example in the case of firing of a gas turbine, then there is a tendency for clutch member 3 to rotate in the same direction as clutch member 4, but a higher speed. Disengagement then occurs between rollers 18 and surfaces 28 and 29 and relative motion occurs between bands 30 and magnets 31. The hysteretic drag resulting from such relative motion tends to rotate cage 19 and rollers 18 to their extreme counterclockwise position as shown in Fig. 2. If clutch member 3 continues to rotate in a clockwise direction the free-wheeling condition is maintained as in the previous case when clutch member 3 was assumed stationary and clutch member 4 was assumed to rotate in the counterclockwise direction. In other words, the hysteretic interaction between magnetic actuating elements 30 and 31 is dependent on relative motion therebetween.

It will be seen from the foregoing description that my invention makes use of magnetic rather than frictional or other forces to effect engagement and disengagement of clutch members in free-wheeling clutches. Furthermore, the invention assures complete disengagement between relatively rotating clutch members in the free-wheeling condition. These features are particularly advantageous at relatively high rotational speeds to minimize losses and other undesirable effects.

While I have chosen to show and describe my invention in terms of a clutch wherein power is directly transmitted through rollers, it will be obvious that the invention is applicable to other free-wheeling mechanisms. An example of such a mechanism which is disclosed and claimed in my copending application Serial No. 138,993, filed January 17, 1950, and assigned to the assignee of the present application, is a variable speed transmission of the type wherein power is transmitted by the spinning and rolling action of balls on various races. In a device of this type the magnetic actuating and holding elements of the present invention may readily be employed to effect free-wheeling action of the fulcrum race should it be desired to effect complete disengagement between the driving and driven races.

While I have shown and described a preferred embodiment of my invention, it will be understood that my invention may well take other forms and I, therefore, aim in the appended claim to cover all such changes and modifications as fall within the true spirit and scope of the invention.

What I claim as new and desire to secure by Letters Patent of the United States is:

A hysteretic free-wheeling clutch comprising first and second relatively rotatable clutch members, said first member being provided with a plurality of wedge slots, a plurality of locking elements formed of magnetic material and confined in said slots, a pair of cooperating magnetic actuating elements, one of said elements being formed of a high coercive force material and the other of said elements including magnetic field-producing means therein, said locking elements being movable with one of said magnetic elements and the other of said magnetic elements being movable with said second clutch member, said locking elements being adapted to being actuated by cooperative hysteretic action of said magnetic elements in response to relative motion therebetween in one directional sense to effect locking engagement with said clutch members and said locking elements being adapted to being actuated by cooperative hysteretic action of said magnetic elements in response to relative motion therebetween in the opposite directional sense to permit free-wheeling of said clutch members, and magnetic means cooperative with said locking elements to maintain said elements out of contact with said second clutch member in the position of said locking elements corresponding to the free-wheeling condition of said clutch.

HUGH M. STEPHENSON.

REFERENCES CITED

The following references are of record in the file of this patent:

UNITED STATES PATENTS

| Number | Name | Date |
| --- | --- | --- |
| 2,300,223 | Hottenroth, Jr. | Oct. 27, 1942 |
| 2,410,818 | Grant, Jr. | Nov. 12, 1946 |